United States Patent
Roberts et al.

(10) Patent No.: US 9,181,895 B2
(45) Date of Patent: Nov. 10, 2015

(54) START-STOP RETROFIT SYSTEMS AND METHODS

(71) Applicant: Johnson Controls Technology LLC, Wilmington (DE)

(72) Inventors: Jason Lee Roberts, Cedarburg, WI (US); Thomas Mark Watson, Milwaukee, WI (US); Steven J. Wood, Shorewood, WI (US); Marvin Eric Taylor, Milwaukee, WI (US); Sepehr Shirazi, Seelze (DE); Ramelle Leigh Gilliland, Milwaukee, WI (US); Kari J. Gilbertson, Cedarburg, WI (US)

(73) Assignee: Johnson Controls Technology Company, Holland, MI (US)

( * ) Notice: Subject to any disclaimer, the term of this patent is extended or adjusted under 35 U.S.C. 154(b) by 335 days.

(21) Appl. No.: 13/691,415

(22) Filed: Nov. 30, 2012

(65) Prior Publication Data

US 2013/0231848 A1    Sep. 5, 2013

Related U.S. Application Data

(60) Provisional application No. 61/605,676, filed on Mar. 1, 2012.

(51) Int. Cl.
*F02N 11/08* (2006.01)
*F04B 49/00* (2006.01)
(Continued)

(52) U.S. Cl.
CPC ......... *F02D 45/00* (2013.01); *B60W 30/18018* (2013.01); *F02N 11/0807* (2013.01);
(Continued)

(58) Field of Classification Search
CPC ................ F02D 45/00; F02D 2400/11; F02N 2200/0801; F02N 11/0818; F02N 2200/062; F02N 2200/063; F02N 2200/103; F02N 2200/102; F02N 2200/064; F02N 2200/061; F02N 2200/022; F02N 11/0814; F16H 61/0031; B60W 30/18018; B60Y 2304/00
USPC .............. 701/101, 102, 112; 123/179.3, 179.4
See application file for complete search history.

(56) References Cited

U.S. PATENT DOCUMENTS 8,504,279 B2 * 8/2013 Ishikawa et al. .............. 701/112
8,915,228 B2 * 12/2014 Fujiwara et al. ........... 123/179.4
(Continued)

FOREIGN PATENT DOCUMENTS

DE      93-09-617 U1    8/1993
DE      2406362 A       3/2005
(Continued)

OTHER PUBLICATIONS

Ashwoods Start-Stop System, http://www.ashwoods.org/ashwoods_hybrid_technologies.php—(printed web page)—Accessed Oct. 2, 2012.

(Continued)

*Primary Examiner* — Hieu T Vo
*Assistant Examiner* — Arnold Castro
(74) *Attorney, Agent, or Firm* — Fletcher Yoder, P.C.

(57) ABSTRACT

A start-stop retrofit kit includes a start-stop module configured to monitor one or more parameters of a vehicle, configured to automatically stop an engine of the vehicle when the vehicle is idling during operation, and configured to automatically start the engine when the vehicle is not idling during operation. The retrofit kit further includes a wire harness configured to couple the start-stop module to a switch disposed between a starter motor and an ignition of the engine of the vehicle, wherein the switch is disposed in parallel with an existing connection between the ignition and the starter motor.

29 Claims, 7 Drawing Sheets

(51) Int. Cl.
  *B60R 16/023* (2006.01)
  *G07C 5/08* (2006.01)
  *F02D 45/00* (2006.01)
  *B60W 30/18* (2012.01)
  *F16H 61/00* (2006.01)

(52) U.S. Cl.
  CPC ........ *F02N11/0814* (2013.01); *F16H 61/0031* (2013.01); *B60Y 2304/076* (2013.01); *F02D 2400/11* (2013.01); *F02N 11/0818* (2013.01); *F02N 2200/022* (2013.01); *F02N 2200/061* (2013.01); *F02N 2200/062* (2013.01); *F02N 2200/063* (2013.01); *F02N 2200/064* (2013.01); *F02N 2200/0801* (2013.01); *F02N 2200/102* (2013.01); *F02N 2200/103* (2013.01); *Y02T 10/48* (2013.01)

(56) References Cited

U.S. PATENT DOCUMENTS

| | | | |
|---|---|---|---|
| 2008/0201064 A1* | 8/2008 | DiGonis | 123/179.4 |
| 2010/0116236 A1* | 5/2010 | Yamaguchi et al. | 123/179.4 |
| 2010/0131152 A1 | 5/2010 | Castonguay et al. | |
| 2010/0262357 A1 | 10/2010 | Dupuis et al. | |
| 2013/0239921 A1* | 9/2013 | Almhagen | 123/179.3 |
| 2014/0305395 A1* | 10/2014 | Chenard | 123/179.4 |

FOREIGN PATENT DOCUMENTS

| | | |
|---|---|---|
| FR | 2955902 A1 | 8/2011 |
| JP | 2008255887 A | 10/2008 |
| WO | 2006/050380 A2 | 5/2006 |
| WO | 20100052047 A1 | 5/2010 |

OTHER PUBLICATIONS

Fuelcat Start-Stop System, http://www.fuelcat.de/sss-start.html—(printed web page and machine translation)—Accessed Oct. 2, 2012, Machine Transition and German Original.

Startronic Start-Stop System, http://www.spritsparen-city.de/Startronic%20Bedienungsanleitung%20Fahrzeuge%20mit-%20Schaltgetriebe.htm—(printed web page and machine translation)—Accessed Oct. 2, 2012, Machine Transition and German Original.

Ashwoods Lightfoot Optimum Control, http://www.ashwoods.org/doclib/Ashwoods%20Lightfoot.pdf—Accessed Oct. 2, 2012.

Ashwoods Hybrid Drive, http://www.ashwoods.org/documents/AshwoodsHybridDrive.pdf—Accessed Oct. 2, 2012.

International Search Report and Written Opinion for PCT Application No. PCT/US2012/068013 dated May 10, 2013, 14 pgs.

* cited by examiner

START-STOP RETROFIT SYSTEMS AND METHODS

CROSS REFERENCE TO RELATED APPLICATIONS

This application claims priority from and the benefit of U.S. Provisional Application Ser. No. 61/605,676, entitled, "Start-Stop Retrofit Systems and Methods," filed Mar. 1, 2012, which is hereby incorporated by reference for all purposes.

BACKGROUND

The invention relates generally to vehicle systems and, more particularly, to start-stop retrofit systems for retrofitting manufactured vehicles.

Many current motor vehicle systems utilize an internal combustion engine that combusts a fuel in the presence of oxygen in a combustion chamber to generate a power supply for the operation of the motor vehicle, such as a car, boat or aircraft. Once the energy from this combustion process has been harnessed to provide power to the vehicle, the remaining hot gases are generally vented, for example, through the exhaust system of a vehicle. Unfortunately, the combustion process may utilize costly fuel as well as lead to the generation of undesirable byproducts (e.g., emissions).

In an effort to reduce these emissions and improve fuel economy, start-stop systems have been developed as an original equipment manufacturer feature on some new vehicle systems. Such integrated start-stop systems may increase fuel efficiency and reduce emissions by stopping the engine when the driver, for example, is stopped at a red light or in heavy traffic. Accordingly, such start-stop systems may reduce the amount of time the engine is idling, thus reducing fuel consumption and unwanted emissions. Unfortunately, many vehicles currently being utilized do not include an integral start-stop system, and therefore, may suffer from fuel inefficiently and produce undesirable emission levels.

BRIEF DESCRIPTION

In an embodiment, a start-stop retrofit kit includes a start-stop module configured to monitor one or more parameters of a vehicle, configured to automatically stop an engine of the vehicle when the vehicle is idling during operation, and configured to automatically start the engine when the vehicle is not idling during operation. The retrofit kit further includes a wire harness configured to couple the start-stop module to a switch disposed between a starter motor and an ignition of the engine of the vehicle, wherein the switch is disposed in parallel with an existing connection between the ignition and the starter motor.

In another embodiment, a method includes activating an engine of a vehicle based on driver input from an ignition interface. The method includes deactivating the activated engine during vehicle operation when the engine is determined to be idling or when a brake of the vehicle is applied, wherein the engine is deactivated using a circuit that is separate from the ignition interface. The method also includes reactivating the deactivated engine during vehicle operation when the brake of the vehicle is not applied, or when a transmission of the vehicle is not engaged, or when a parameter of a battery of the vehicle is beyond a threshold value, wherein the engine is reactivated using the circuit that is separate from the ignition interface.

In another embodiment, a method of remanufacturing a vehicle includes installing a start-stop module in the vehicle having an engine, wherein the start-stop module is configured to reduce an amount of time that the engine is idle during operation of the vehicle. The method also includes communicatively coupling the start-stop module to an engine control unit of the vehicle via a wire harness, communicatively coupling the start-stop module to a brake system of the vehicle via the wire harness, and communicatively coupling the start-stop module to a clutch system of the vehicle via the wire harness. The method also includes coupling a switch to an ignition and starter motor of the vehicle as well as the start-stop module via the wire harness, wherein the switch is configured to start and stop the engine of the vehicle based on control signals from the start-stop module. The method further includes communicatively coupling the start-stop module to a battery sensor of the vehicle via the wire harness.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
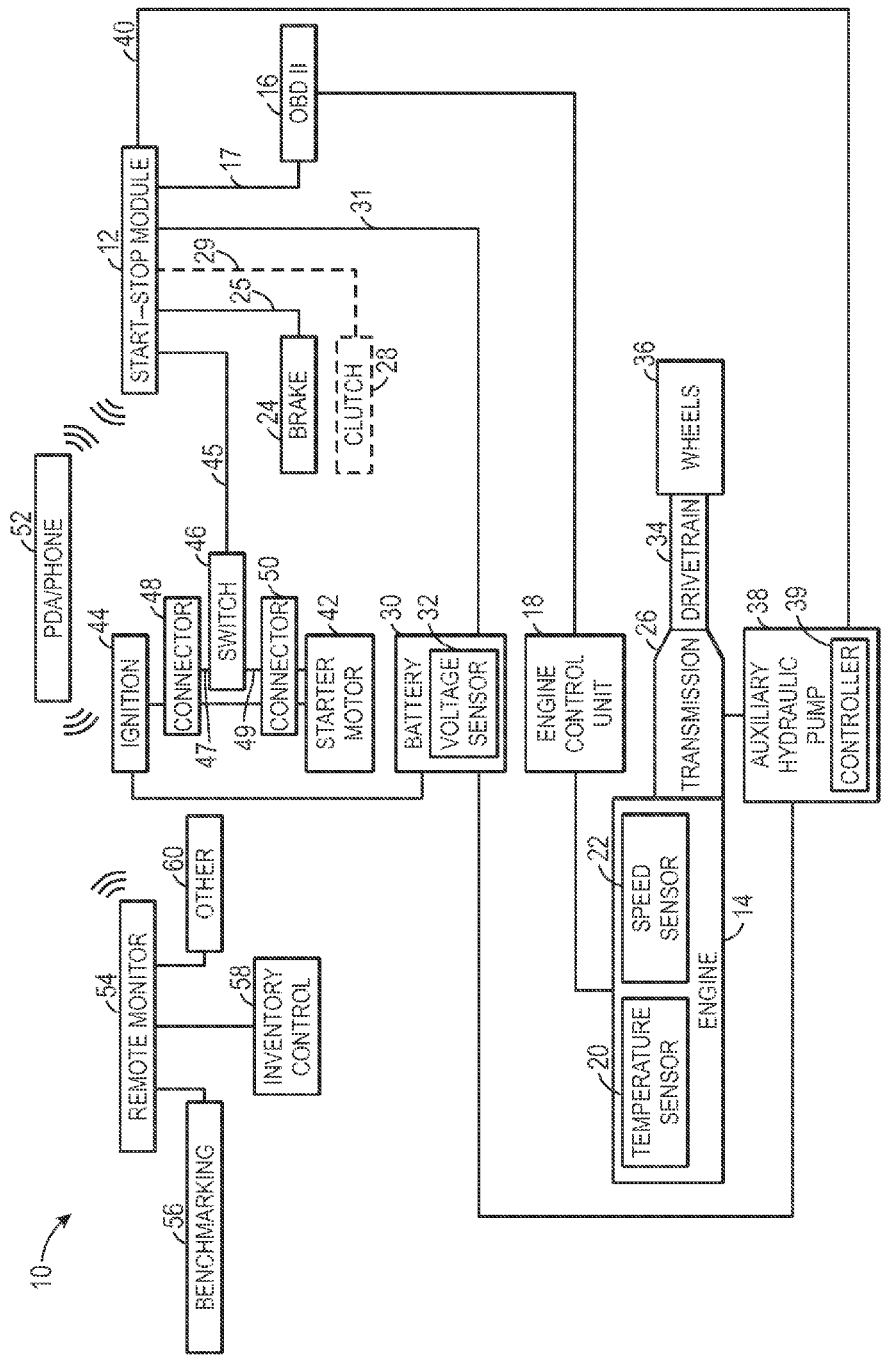
FIG. 1 is a block diagram illustrating an embodiment of a vehicle system modified with an embodiments of a start-stop retrofit kit.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As set forth in greater detail below, provided herein are embodiments of start-stop retrofit systems suitable for modifying vehicle systems that do not have an integral start-stop functionality (e.g., as a manufacturer installed option). That is, the provided start-stop retrofit systems may be used to modify existing vehicles such that the modified vehicles are able to automatically shut down and restart the engine of the vehicle in a controlled manner during operation, thus reducing the idling time of the engine during use. The foregoing feature may enable existing vehicles modified with the disclosed start-stop retrofit kits to operate with higher fuel efficiency and lower emissions than unmodified vehicles. Furthermore, the present approach may be applied to any vehicle that includes a combustion engine, such as an internal combustion engine vehicle or a hybrid xEV (e.g., a hybrid electric vehicle (HEV), plug-in hybrid vehicle (PHEV), or other suitable hybrid xEV), which may use a combination of electric power and power from a combustion engine to move the vehicle.

Additionally, presently disclosed embodiments of the start-stop retrofit kit may include an application or program suitable for use with a personal digital assistant (PDA), a smartphone, or other suitable handheld computing device. For example, in certain embodiments, a start-stop application may be utilized on a smartphone to communicate information to the user regarding, for example, the efficiency of the user's driving behavior. That is, presently disclosed embodiments may utilize the user's PDA or smartphone to both indicate to the driver whether or not the driver's current behavior is efficient as well as to make recommendations to train the driver to adopt a more efficient driving pattern. Still further, in some embodiments, the start-stop retrofit kit may include an online application capable of storing information about the driving history of the user, emailing the user with pertinent alert messages, providing the user with data related to fuel economy, and so forth.

Turning now to the drawings, FIG. 1 illustrates a vehicle system 10 having an embodiment of the start-stop retrofit kit installed therein. In particular, the illustrated vehicle system 10 includes a start-stop module 12. In general, the start-stop module 12 may be capable of receiving inputs regarding vehicle operation as well as generating outputs suitable for controlling the starting (e.g., activation) and stopping (e.g., deactivation) of an engine 14, in accordance with the operation of the vehicle, in order to reduce or eliminate the amount of time the engine 14 idles during operation. To that end, the illustrated start-stop module 12 couples to an on-board diagnostics II (OBD-II) port 16 that enables the start-stop module 12 to access information regarding vehicle operation. In other embodiments, the start-stop module 12 may instead couple to a European on-board diagnostics (EOBD) port. Through the OBD-II port 16, the illustrated start-stop module 12 may acquire information from an engine control unit 18 regarding operation of the vehicle's engine 14, such as the engine's temperature as measured by a temperature sensor 20, the engine's speed as measured by the speed sensor 20, and or any other relevant parameter. Accordingly, the start-stop module 12 may monitor all or many parameters relevant to the operation of the vehicle using a number of existing onboard vehicle sensors via the controller area network (CAN) bus associated with the engine control unit 18.

Additionally, the start-stop module 12 may be communicatively coupled to a brake system 24 (e.g., via the illustrated cable 25) and may monitor operation of the brake system 24 to acquire information relevant to whether or not the brake of the vehicle is currently being applied (e.g., to decelerate the vehicle). For example, as described greater detail below, the start-stop module 12 may monitor the position of the switch that couples the brakes to the brake lights (or another suitable portion of the brake system) and utilize this information to determine whether or not the brake of the vehicle is currently being applied. It should be noted that, in certain embodiments, the transmission 26 of the vehicle may be manual. For such manual transmission vehicles, the start-stop module 12 may be communicatively coupled to the clutch 28 (e.g., via the illustrated cable 29) such that the engagement or disengagement of the clutch 28 may be monitored, in addition or in alternative to, the brake system 24, to determine when the vehicle is at rest. Additionally, the illustrated start-stop module 12 is connected to a battery 30 of the vehicle (e.g., via the illustrated cable 31) such that one or more parameters of the battery 30 (e.g., battery voltage measured by a voltage sensor 32) may be communicated to the start-stop module 12. In other embodiments, other parameters of the battery 30 may include state of charge (SOC) of the battery, temperature of the battery, calendar or cycle age of the battery, or other suitable parameters.

It should be noted that the start-stop module 12 may include a variety of suitable implementation-specific internal components. For example, the start-stop module 12 may include hardware and software suitable for receiving various inputs relating to the operation of the vehicle and for utilizing those inputs to determine whether or not the vehicle is in motion. To that end, the start-stop module 12 may include interface circuitry, memory, control and processing circuitry, and so forth. Further, it should be noted that in some embodiments, the start-stop module 12 may be configured for use with a variety of different types of vehicles, while in other embodiments, the start-stop module 12 may be vehicle specific.

In the illustrated system 10, the engine 14 is coupled to the transmission 26, a drivetrain 34, and wheels 36. In embodiments in which the transmission 26 is automatic, the start-stop retrofit kit may include an auxiliary hydraulic pump 38 that couples to the transmission 26 (e.g., to the high pressure side of the transmission 26). As discussed below, when the engine 14 is turned off by the start-stop module 12 during operation of the vehicle, the auxiliary hydraulic pump 38 may circulate hydraulic fluid throughout the transmission 26. To that end, the illustrated hydraulic pump 38 is coupled to the battery 30 from which the hydraulic pump 38 receives power during operation. Additionally, a controller 39 may be coupled to the start-stop module 12 (e.g., via the illustrated cable 40) to coordinate and control operation of the hydraulic pump 38.

To enable the illustrated start-stop module 12 to start and stop the engine to reduce or eliminate vehicle idling, the start-stop module 12 may be further connected to a starter motor 42 and ignition 44 of the vehicle. In certain embodiments, the connection between the start-stop module 12, the starter motor 42, and the ignition 44 in the retrofitted vehicle may be in parallel with the normal (e.g., manufacturer installed) connection between the ignition 44 to the starter motor 42 so that normal operation (e.g., starting and stopping the engine upon driver instruction via an ignition interface, such as a key-based ignition interface, a push-button ignition interface, and/or a remote-start ignition interface) may be maintained. The illustrated start-stop module 12 is communicatively coupled to a switch 46 via cable 45. Furthermore, the illustrated switch 46 is coupled via cable 47 to a connector 48 that attached to the ignition 44, while the switch 46 is coupled via cable 49 to the connector 50 that is attached to the starter motor 42. As illustrated in FIG. 1, the start-stop module 12 may utilize the switch 46 to engage or disengage the starter motor 42 and/or the ignition 44, in accordance with the vehicle's operation, in order to start or stop (e.g., activate and deactivate) the engine, based on the criterion discussed below.

The illustrated system 10 also includes a smartphone, PDA, or other suitable handheld computing device 52 is communicatively coupled to the start-stop module 12. For example, in certain embodiments, the start-stop module 12 may communicate with the smartphone 52 via a suitable wired or wireless protocol. In certain embodiments, the start-stop module 12 may communicate one or more measured or determined parameters of vehicle and/or engine operation to the smartphone 52 for further calculation and/or communication to the user. For example, the start-stop module 12 may transmit data to the smartphone 52 corresponding to an indication of whether or not the driver is operating the vehicle in an efficient manner. The start-stop application in the smartphone 52 may then provide recommendations that are communicated to the driver and correspond to suggested driving modifications that may result in improved efficiency. Further, the start-stop module 12 may communicate data corresponding to the parameters that one or more sensors disposed in the system 10 measured. For example, the start-stop module 12 may communicate the voltage of the battery 30 measured by the voltage sensor 32 to the user, and the application on the smartphone 52 may utilize this information to alert the user when battery failure is imminent. Further, it should be noted that in some embodiments, the start-stop module 12 may also be configured as a remote start device. In these embodiments, a user may remotely communicate with the start-stop module 12, for example, via the smartphone 52, to start the vehicle while the user is remotely located. Still further, after remotely starting the vehicle, the user may receive information regarding the vehicle's operation (e.g., vehicle temperature, battery voltage, etc.) via the smartphone 52.

Additionally, the smartphone 52 may be communicatively coupled to a remote monitor 54 that may enable benchmarking 56, inventory control 58, or other functions 60 to be performed in accordance with the information provided by the start-stop module 12. For example, in one embodiment, the remote monitor 54 may monitor how many vehicles have batteries with drainage levels that indicate that replacement will be likely in a given timeframe such that this information may be used to predict future battery demand for the purposes of inventory control 38. In another embodiment, the benchmarking 56 may include providing a driver of a particular vehicle type with information regarding how that driver's profile compares to the profiles of other drivers of the same vehicle type. Additionally, in some embodiments, the benchmarking 56 may include determination of a driving performance score. The driving performance score may, for example, indicate to a potential vehicle purchaser how aggressively the vehicle was driven compared to other similar vehicles. In this way, the information accumulated via the start-stop module 12 may be utilized for a variety of suitable additional purposes.

Figure 2:
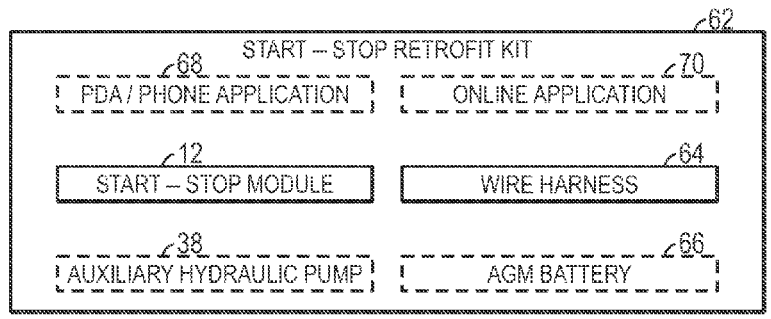
FIG. 2 is a block diagram illustrating example internal components that may be included in an embodiment of a start-stop retrofit kit.

As mentioned, the disclosed start-stop system 10 may be implemented by installing a start-stop retrofit kit on to an existing vehicle that lacks all or some of the disclosed start-stop functionality. FIG. 2 illustrates an embodiment of a start-stop retrofit kit 62, which include the start-stop module 12, a wire harness 64, the auxiliary hydraulic pump 38, an absorption glass mat (AGM) battery 66, a PDA/smartphone application 68, an online application 70, or a combination thereof. For example, in one embodiment in which the vehicle transmission is automatic and the unmodified vehicle is equipped with a lead acid battery, the retrofit kit 62 may include the start-stop module 12, the wire harness 64, the auxiliary hydraulic pump 38, the AGM battery 66, and optionally, the applications 68 and 70. For embodiments of the start-stop retrofit kit 62 including the AGM battery 66, it should be appreciated that the start-stop module 12 may include one or more algorithms (e.g., stored in a memory and executed by a processor) specifically adapted for monitoring and controlling the behavior of the AGM battery 66. For further example, in an embodiment in which the vehicle transmission is manual and the unmodified vehicle is equipped with an AGM battery, the retrofit kit 62 may include the start-stop module 12, the wire harness 64 (e.g., including the clutch cable 29), and, optionally, the applications 68 and 70. Indeed, it should be noted that the composition of the start-stop retrofit kit 62 is subject to a variety of implementation-specific modifications, depending on factors such as the transmission type, the existing battery type, whether or not the user desires to utilize the smartphone and online capabilities of the system, and so forth. Furthermore, in certain embodiments, a start-stop retrofit kit 62 may be designed for installation on a vehicle having at least some start-stop functionality as a manufacturer-installed option, for example, to provide additional features (e.g., the PDA/smartphone application 68, the online application 70, and so forth) to the driver.

In certain embodiments, the PDA/smartphone application 68 may include a user interface to provide a driver with information regarding the status of the vehicle, the performance of the vehicle, the efficiency of the driver, and so forth. For example, turning to FIG. 3, an example of a user interface 80 (e.g., provided by the PDA/smartphone application 68) is illustrated that may be used to display information to the driver. As illustrated, the user interface 80 includes information regarding the average fuel efficiency of the vehicle, which may be illustrated in numeric form (e.g., element 82) and/or in graphical form (e.g., element 84). The illustrated user interface 80 further includes a battery state of charge (SOC) indicator 86. It should be appreciated that the illustrated indicators (e.g., in elements 82 and 84) include colored bars with indicators as examples of graphically indicating; however, in other embodiments, these indicators may include graphs, charts, color-coded indicators, or other suitable graphical elements. The illustrated user interface 80 includes a gear indicator 88, a brake indicator 90, an engine status indicator 92, a battery status indicator 94, and a vehicle service indicator 96. Furthermore, in certain embodiments, the user interface 80 may include selectable options (e.g., via a touchscreen or other input device of the smartphone 52), such as the enable/disable button 98, which the driver may utilize to enable or disable the operation of the start-stop module 12 during operation of the vehicle. In certain embodiments, the user interface may include a selectable option, such as button 100, whereby a driver may perform one or more diagnostic routines to ensure that the start-stop system 10 is functioning properly.

In certain embodiments, the user interface 80 of the PDA/smartphone application 68 may include a performance section 102 capable of providing feedback to the driver during and/or after a driving event to enable the driver to maximize the fuel economy of the retrofit or originally installed start-stop system. In one embodiment, the performance section 102 may provide recommendations to the driver regarding driving behavior modifications the driver may make to better utilize the start-stop functionality. For example, the start-stop module 12 may utilize the vehicle speed profile to identify whether the driver is inefficiently utilizing the start-stop system 10 during braking or stopping instances. For instance, if the driver typically creeps forward at an intersection after stopping the vehicle, the start-stop system 10 may prematurely restart the engine to power the forward motion before the driver proceeds forward through the intersection. Therefore, the performance section 102 may inform the driver that creeping forward in an intersection before the driver is ready to proceed through the intersection is inefficient driving behavior, and, further, may recommend that the driver remains at a full stop until the driver is ready to continue through the intersection.

Additionally, in another embodiment, the performance section 102 may alert the driver if the battery health or state of charge is at or near a level that is insufficient to support use of the start-stop system 10. For example, the start-stop module 12 monitor parameters of the battery 30 and may alert the driver when the battery needs to be replaced or inform the driver that the current state of charge of the battery is too low to support the stop-start functionality using the performance section 102. Still further, the performance section 102 may provide recommendations to the driver regarding possible modifications to the driver's accessory usage during instances when the engine is stopped. For example, the performance section 102 may recommend a reduction in accessory usage when the engine is stopped to reduce the electrical draw on the battery. Indeed, the start-stop system 10 may provide any suitable recommendations to the driver via the performance section 102 to inform the driver which driving behaviors affect the efficiency of the start-stop system. Additionally, at the conclusion of a drive event, the performance section 102 may provide a summary, which may include information such as a driver rating, the quantity of actual stopped events versus the quantity of possible stopped events, recommendations regarding driving behavior changes, and so forth. Furthermore, in certain embodiments, the information and/or suggestions provided to the driver in the performance section 102 may be otherwise provided to the driver (e.g., auditory feedback, graphical feedback, color indicators, or other suitable feedback) to coach the driver toward a driving style that provides the most efficient use of the start-stop system 10.

Figure 4:
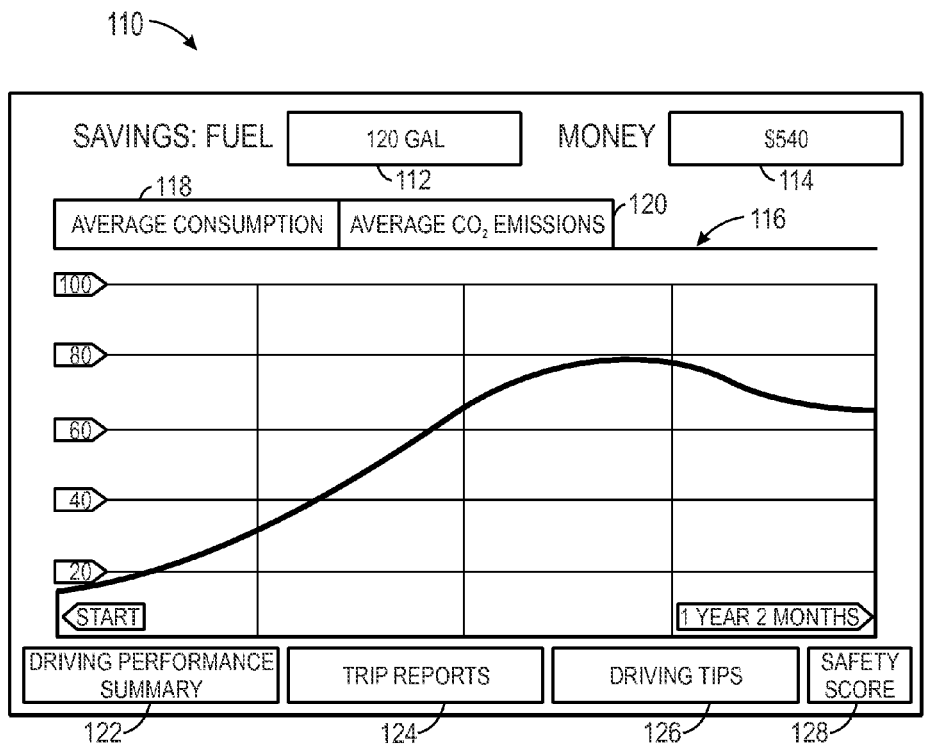
FIG. 4 is a simulated screenshot of an embodiment of the online application of FIG. 2.

Furthermore, as mentioned in FIG. 2, the start-stop retrofit kit 62 may include an online application 70 that may be accessed by the driver to glean further information about the start-stop system 10. FIG. 4 illustrates an example of a user interface 110 that the driver may access and use to retrieve this information. It should be appreciated that, in certain embodiments, the data presented in the online application 70 may be information provided to the remote monitor 54 by the start-stop module 12 (e.g., via the PDA/smartphone 52). It should further be appreciated that, in certain embodiments, the online application 70 may be accessed from the PDA/smartphone 52, or any other networked computing device.

The user interface 110 of the online application 70 illustrated in FIG. 4 has a heading for "Savings" that includes fields 112 and 114, representing savings provided by the start-stop system 10 in terms of fuel and money, respectively. The user interface 110 further includes a graph 116 that demonstrates either average fuel consumption or average $CO_2$ emission for the vehicle over a designated period of time, depending on which tab (e.g., tab 118 or 120) is selected. In certain embodiments, other parameters of the vehicle may be graphed to illustrate the benefit of the start-stop system 10 to the driver.

In certain embodiments, the user interface 110 of the online application 70 illustrated in FIG. 4 includes user selectable options, such as the illustrated driving performance summary button 122, the trip reports button 124, the driving tips button 126, and the safety score button 128. Upon selecting the driving performance summary button 122, the driver may be presented with a summary of driving performance (e.g., including average fuel savings, average cost savings, average trip length, average efficiency, or other suitable performance measures) over a selectable period of time. Using the trip reports button 124, the driver may be presented with performance measures organized by specific driving routes (e.g., drive to work, drive home from work, drive to store, drive home from store, and so forth). The driving tips button 126 may enable the driver to view a collection of driving tips (e.g., recommendations made to the driver in the performance section 102 of the PDA/smartphone application 68) that have been suggested to the driver during the course of operating the start-stop system 10. Additionally, the safety score button 128 may enable the driver to access a safety score (e.g., a numerical value from 1 to 100 indicating a level of safety or aggressiveness) for the driver of the start-stop vehicle 10 as determined by the start-stop module 12 and/or the remote monitor 54 based on the parameters of the vehicle monitored by the start-stop system 10.

Figure 5:
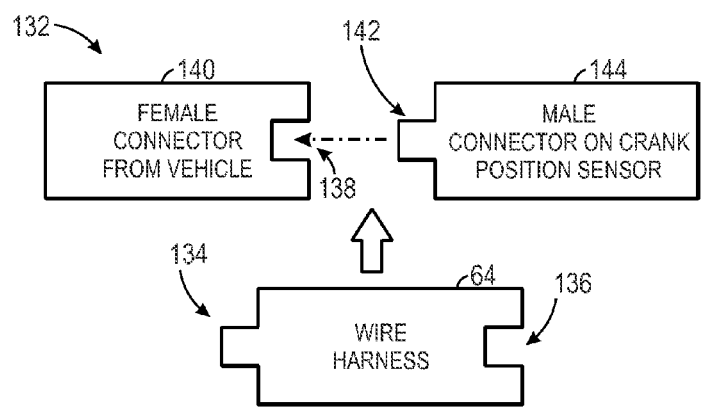
FIG. 5 is a schematic illustrating an embodiment of the wire harness of FIG. 2.

In general, each connection of the wire harness 64 of the start-stop retrofit kit 62 may allow for the start-stop module 12 to communicatively couple to the various components of the vehicle, as illustrated in FIG. 1, while still allowing for normal (e.g., manufacturer installed) communication and operation of these components. With this in mind, FIG. 5 is a schematic illustrating a portion 132 of an embodiment of the wire harness 64 of FIG. 2, in which the harness still may allow for pass-through communication. In the illustrated embodiment, the portion 132 of the wire harness 64 includes a female connection end portion 134 and a male connection end portion 136. As shown, the male connection portion 134 of the wire harness 64 may be adapted to mate with a female connection portion 138 of a female connector 140 from the vehicle. Similarly, the female connection portion 136 is adapted to mate with a male connection portion 142 of a connector on a crank position sensor 144. In this way, during installation of the start-stop retrofit kit 62, the wire harness 64 may be coupled to existing connections between vehicle and sensor components (e.g., "plug-and-play"), thus enabling efficient retrofitting of existing vehicles. It should be appreciated that the foregoing feature of the wire harness 64 may reduce or eliminate the likelihood that installation of the wire harness 64 may require wire cutting for installation of the start-stop retrofit kit 62. Further, it should be noted that the wire harness 64 may be adapted in the illustrated manner or in a similar way to enable a parallel connection to be made with a variety of implementation-specific components of the vehicle, not limited to the components illustrated in FIG. 5. Additionally, in some embodiments, the wire harness 64 may be adapted to integrate with vehicle-specific connections. That is, a variety of wire harnesses may be provided, each corresponding to a different vehicle type and being designed to connect with the pre-existing connections in the intended use vehicle.

Figure 6:
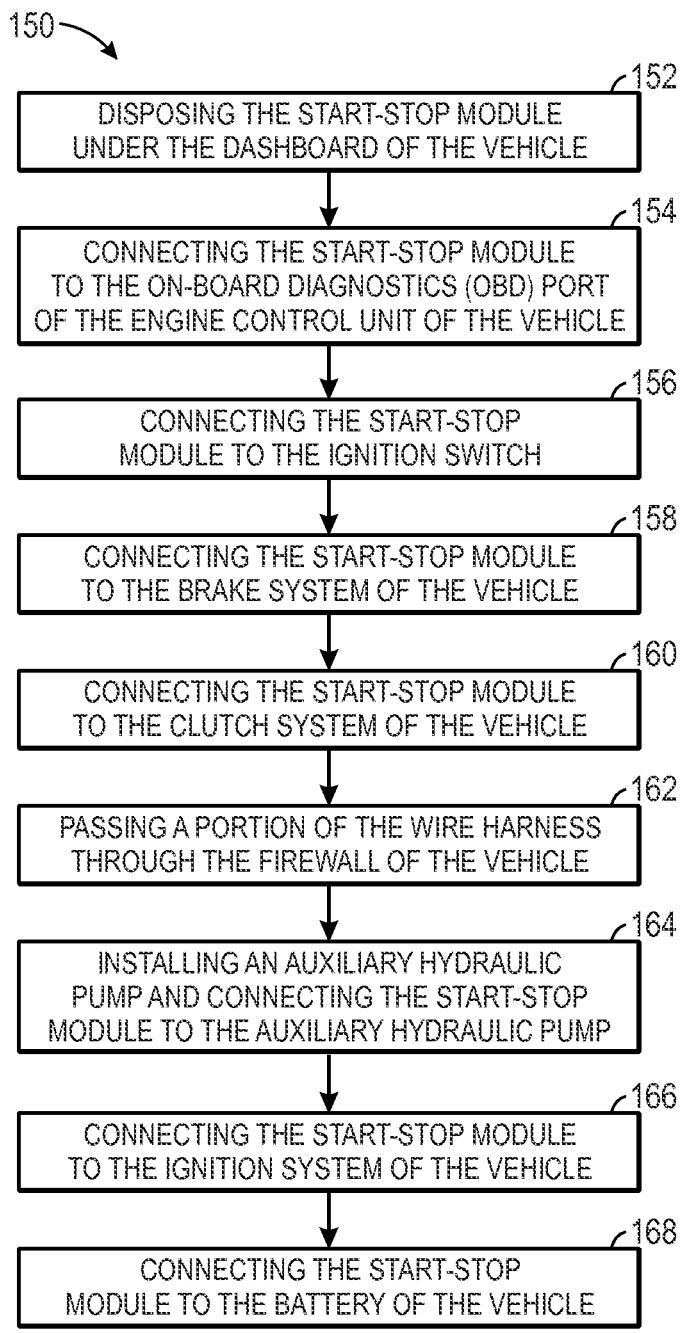
FIG. 6 is a flow diagram illustrating an embodiment of a process by which the start-stop retrofit may be installed on a vehicle.

With the foregoing in mind, FIG. 6 illustrates a flow diagram of a method 150 by which an embodiment of the start-stop retrofit kit 62 may be installed on a vehicle. Furthermore, FIG. 7 visually illustrates many of the installation steps set forth in the method 150 of FIG. 6 and, therefore, may be referenced throughout the discussion of the method 150 to better illustrate the method 150 of remanufacturing the vehicle using the disclosed start-stop retrofit kit 62. It should be appreciated that, in other embodiments, certain steps illustrated in FIG. 6 may the skipped or performed in an alternative order. It should be also appreciated that, in certain embodiments, a single start-stop module 12 may be suitable for use with a variety of types of vehicles. In such instances, upon installation, the start-stop module 12 may be adapted to automatically recognize the type of vehicle to which it is connected. In other embodiments, during installation, a switch, button, or other control device may be utilized to inform the start-stop module 12 of the vehicle type. As such, these features may enable a single start-stop module 12 to be suitable for use with more than one type of vehicle.

Figure 7:
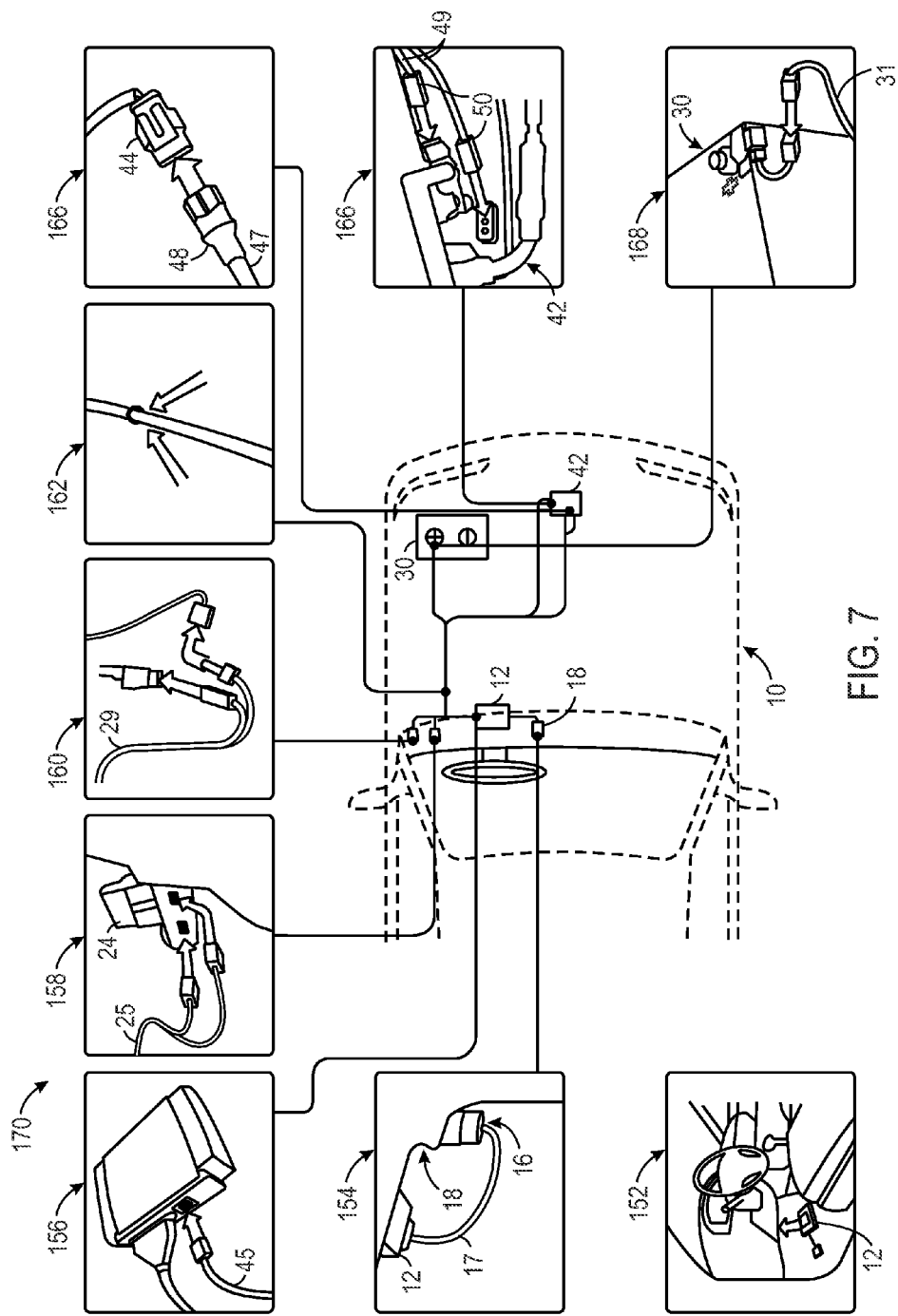
FIG. 7 is a schematic illustrating how an embodiment of the start-stop retrofit kit may be installed on the vehicle.

With the foregoing in mind, the method 150 begins with the start-stop module 12 being disposed under the dashboard of the vehicle (block 152). As illustrated in the corresponding illustration 152 of FIG. 7, the start-stop module 12 may be disposed beneath the dashboard of the vehicle on the driver side or in another suitable location. In certain embodiments, the start-stop module 12 may be adhered beneath the dashboard using a fastener, adhesive, and/or other suitable attachment mechanism (e.g., hook and loop fasteners or other suitable mechanisms). Returning to FIG. 6, the method 150 continues with the start-stop module 12 being coupled (block 154) to the engine control unit 18 via an on-board diagnostics (OBD) port. As shown in FIG. 7, block 154 illustrates the start-stop module 12 disposed beneath the dashboard of the vehicle having been coupled to the OBDII port 16 of the engine control unit 18 via the cable 17.

Continuing through the method 150 illustrated in FIG. 6, next the start-stop module 12 may be coupled (block 156) to the switch 46 discussed in FIG. 1. Turning to FIG. 7, block 156 illustrates the cable 45, in which the distal end (not shown) is coupled to the switch 46, being coupled to the start-stop module 12 disposed beneath the dash of the vehicle. The cables 47 and 49 that couple the ignition switch 46 to the connectors 48 and 50, respectively, as illustrated in FIG. 1, are discussed in detail below. Returning to FIG. 6, next the start-stop module 12 may be coupled (block 158) to the brake system (e.g., the brake light sensor) of the vehicle. Turning to FIG. 7, block 158 illustrates the cable 25 of the wire harness 64, having the distal end (not shown) attached to the start-stop module 12, being coupled to a brake sensor (e.g., the brake light interface) below the dash of the vehicle. Similarly, for embodiments involving a manual transmission vehicle, the method 150 illustrated in FIG. 6 further includes connecting the start-stop module to a clutch sensor. Accordingly, turning once more to FIG. 7, block 160 illustrates the cable 29 of the wire harness 64, having the distal end (not shown) attached to the start-stop module 12, being coupled to a clutch sensor or clutch interface below the dash of the vehicle.

Next in the method 150 illustrated in FIG. 6, a portion of the wires of the wire harness 64 may be passed (block 162) through the firewall of the vehicle. In particular, as set forth in FIG. 1, a number of the connections to the start-stop module 12 include connections to components (e.g., the starter, battery, transmission, and so forth) that may be separated from the start-stop module 12 by a firewall. Accordingly, a number of connectors and/or cables may be passed through the firewall to couple the start-stop module 12 with the aforementioned components of the engine and/or transmission. In particular, in certain embodiments, the cables 31, 40, 47, and/or 49, or any combination thereof, may traverse the firewall to couple to other components of the vehicle. Turning once more to FIG. 7, block 162 illustrates a bundle of cabling, comprising the cables 31, 40, 47, and/or 49, bundled together to traverse the firewall of the vehicle.

Once the appropriate cables have them pass through the firewall of the vehicle, in embodiments involving an automatic transmission vehicle, the method 150 of FIG. 6 continues with the installation (block 164) of the auxiliary hydraulic pump 38 and coupling the start-stop module 12 to the auxiliary hydraulic pump 38 using the cable 40, which traversed the firewall with the other cabling. For embodiments lacking an automatic transmission, block 164 may be skipped and cable 40 may not be used.

For both manual and automatic transmission vehicles, the method 150 of FIG. 6 continues with connecting (block 166) the start-stop module to the ignition system of the vehicle. Turning briefly to FIG. 7, two connections are indicated as corresponding to block 166 of FIG. 6. That is, as illustrated in elements 166 of FIG. 7, coupling the start-stop module 12 to the ignition system of the vehicle comprises two connections. The cable 47, having traversed the firewall, is coupled to the ignition of the vehicle 44 via connector 48. Similarly, the cable 49, having also traversed the firewall, is coupled to the starter of the vehicle be a connector 50.

Finally, turning back to FIG. 6, the start-stop module 12 may be coupled (block 168) to the battery of the vehicle. For example, block 168 illustrated in FIG. 7 shows the cable 31 of the wire harness 64, having a distal end (not shown) coupled to the start-stop module 12 on the opposite side of the firewall, being connected to the battery 30 of the vehicle. In certain embodiments, the cable 31 may be coupled to one or more battery sensors (e.g., the voltage sensor 32 illustrated in FIG. 1), which may, in turn, be coupled to the battery 30. Accordingly, the start-stop module 12 may be able to monitor one or more parameters of the battery 30 (e.g., battery voltage, current, SOC, temperature, and so forth) during operation of the start-stop system 10.

Figure 8:
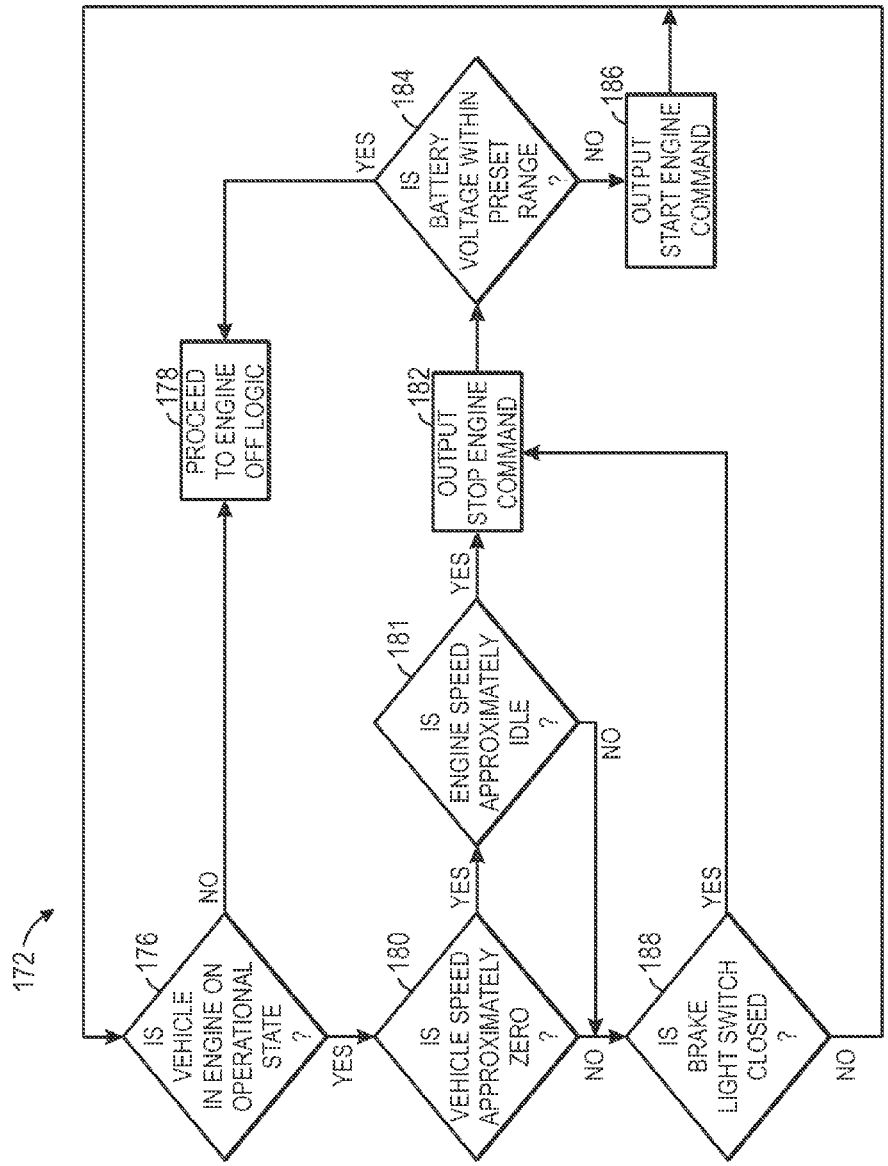
FIG. 8 illustrates an embodiment of a process that may be employed by a start-stop module to monitor a started engine to determine if the engine should be stopped.
Figure 9:
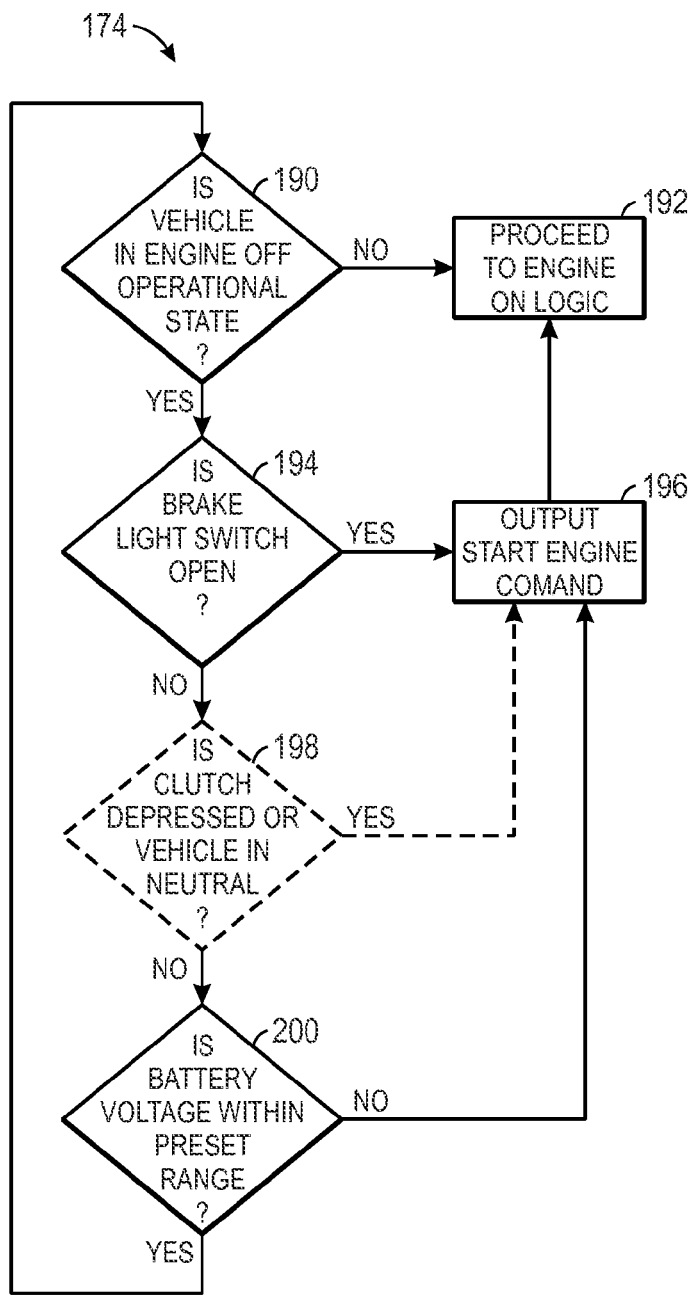
FIG. 9 illustrates an embodiment of a process that may be employed by a start-stop module to monitor a stopped engine to determine if the engine should be started.

FIGS. 8 and 9 illustrate embodiments of methods 172 and 174 that may be implemented by the start-stop module 12 to identify instances in which it may be desirable to start or stop the engine of the vehicle. However, it should be noted that the illustrated methods 172 and 174 are merely examples, and any suitable control logic may be utilized by the start-stop module 12 to make such determinations. Additionally, it should be noted that although the illustrated control logic includes multiple potential indicators of whether or not the engine is idling, in certain embodiments, only a single indicator may be utilized by the start-stop module 12 to control operation.

Specifically, the method 172 illustrated in FIG. 8 includes an inquiry as to whether the current state of the engine is in an ON operational state (block 176). If the engine is not in an ON state, the method 172 proceeds to the engine OFF logic (block 178) provided in FIG. 9. However, if the engine is in an ON state, the method 172 proceeds to inquire as to whether the vehicle speed sensors indicate that the vehicle speed is approximately zero or below a threshold value (block 180). In an embodiment, if the vehicle speed is approximately zero or below the threshold value, this measurement may be utilized as an indication that the engine may be idling, and an inquiry may be made (block 181) as to whether the engine speed is approximately idle or below threshold value (e.g., 500 revolutions per minute (RPM)). If the engine speed is approximately idle or below the threshold value, a stop engine command may be output (block 182) by the start-stop module 12. It should be noted that in a similar manner, one or more additional verification steps may be performed by the start-stop module to verify that the vehicle is at rest before a stop engine command is output. That is, in certain embodiments, the start-stop module may check for a first indicator of whether the vehicle is idling and then check one or more additional indicators to reduce or eliminate the possibility that a control signal is generated based on an inaccurate indicator.

In some embodiments, the method 172 illustrated in FIG. 8 may include monitoring for a substantial loss of battery charge that may occur during prolonged instances of the engine OFF operational state, for example, when the vehicle is stopped at a train crossing. To that end, the method 172 may include an inquiry as to whether the detected battery voltage is within a desired range (block 184). In other embodiments, the start-stop module 12 may determine a different parameter of the battery (e.g., current, SOC, temperature, age, or another suitable battery parameter) to determine if the parameter is below or beyond a threshold value. If the detected battery voltage is not in the desired range, the engine may be restarted (block 186), thus substantially reducing or eliminating the likelihood that excess battery drainage may impact the ability of the vehicle to be restarted when desired. In other embodiments, the determination of block 184 may, additionally or alternatively, include a determination and comparison of the battery SOC, temperature, voltage, current, remaining power, estimated remaining range, and so forth to a limit value to determine whether or not the engine should be stopped.

If the vehicle speed is not approximately zero, the method 172 illustrated in FIG. 8 proceeds to inquire as to whether the brake light switch is closed (block 188). If the brake light switch is closed, the start-stop module 12 may interpret this information as an indication that the driver is stopping or has stopped the vehicle, and the stop engine command may be output (block 182). Again, the method 172 provides for a check as to whether or not the battery voltage is within a suitable range for restarting the engine when desired (block 184), and if the engine remains in an OFF operational state, the start-stop module 12 may proceed to the engine OFF logic provided in FIG. 9 (block 178).

Figure 3:
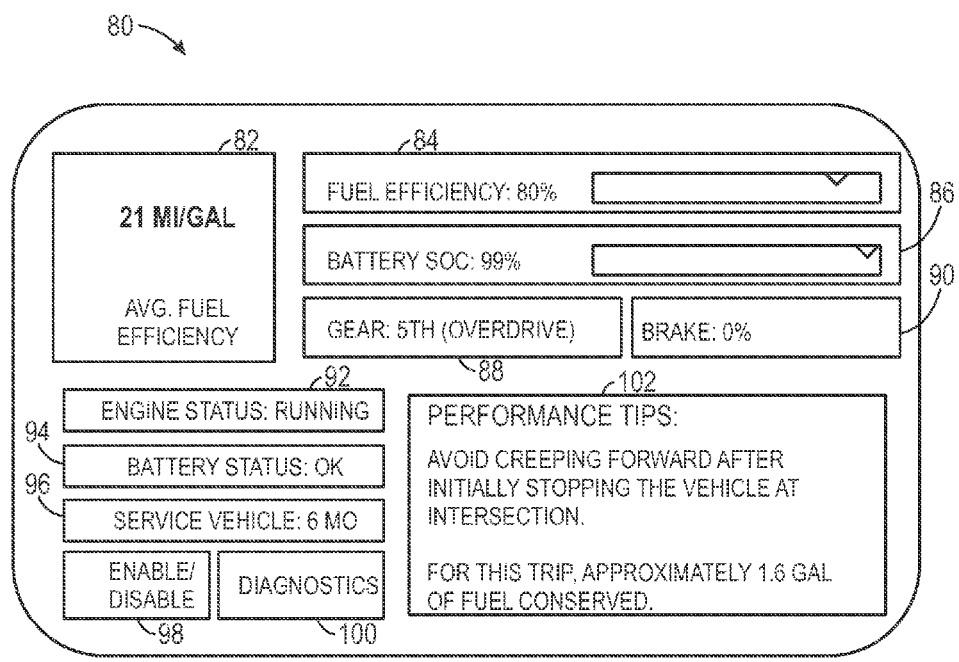
FIG. 3 is a simulated screenshot of the personal data assistant (PDA) or smartphone illustrated in FIG. 1 executing an embodiment of the PDA/phone application of FIG. 2.

The method 174 illustrated in FIG. 9 begins with an inquiry as to whether the vehicle is in an engine OFF operational state (block 190), and if the engine is not in an OFF operational state, the start-stop module 12 proceeds to the engine ON logic (block 192) provided in FIG. 3. If the engine is in an OFF operational state, an inquiry is made as to whether the brake light switch is open (block 194). An opening of the brake light switch may be interpreted as an indication that the driver would like to place the vehicle in motion, and the start-stop module 12 outputs a start engine command (block 196).

In embodiments in which the vehicle includes a manual transmission, the method 174 illustrated in FIG. 9 includes an inquiry as to whether the clutch is depressed or the vehicle has been placed into neutral (block 198), and if either of these conditions is met, the start-stop module 12 outputs the start engine command (block 196). Here again, the start-stop module 12 may monitor the battery voltage to determine if the battery voltage is in a range suitable for restarting the engine (block 200), and if the measured voltage is not in the desired range, the start-stop module 12 restarts the engine (block 196) to reduce or eliminate the likelihood that the vehicle will not be able to restart when desired.

Accordingly, it should be appreciated that the presently disclosed approach offers several technical effects. For example, the present approach utilizes the disclosed wire harness 64 that obviates splicing of wires during installation, simplifying the installation process and reducing the likelihood of disrupting other normal operations of the vehicle. Also, the disclosed wire harness 64 couples to and utilizes portions of the vehicles existing electronics (e.g., the engine control unit 18, the brake light sensor 24, etc.), limiting the number of components in the start-stop retrofit kit 62 while reducing the cost and installation time for the kit. Additionally, via the disclosed PDA/smartphone application 68, a driver may be provided with driving feedback in real-time, including efficiency and driving tips for improved performance. Furthermore, using the disclosed online application 70, the driver may be provided with more information regarding the performance of his or her vehicle in comparison to similar vehicles utilizing the disclosed start-stop system 10. Also, the disclosed remote monitor 54 may receive information regarding the performance of the start-stop system 10, and may further utilize this information to, for example, perform inventory control, benchmarking, marketing, and so forth, based on the received information.

While only certain features and embodiments of the invention have been illustrated and described, many modifications and changes may occur to those skilled in the art (e.g., variations in sizes, dimensions, structures, shapes and proportions of the various elements, values of parameters (e.g., temperatures, pressures, etc.), mounting arrangements, use of materials, colors, orientations, etc.) without materially departing from the novel teachings and advantages of the subject matter recited in the claims. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

The invention claimed is:

1. A start-stop retrofit kit, comprising:
a start-stop module configured to monitor one or more parameters of a vehicle and to automatically stop and start an engine of the vehicle based on the one or more parameters; and
a wire harness configured to couple the start-stop module to the vehicle, wherein the wire harness comprises:
a first portion configured to plug into an ignition interface of the vehicle;
a second portion configured to plug into a starter motor of the vehicle;
a switch disposed between the first portion and the second portion, wherein the switch is configured to be selectively activated by the start-stop module to deliver signals from the ignition interface to the starter motor to start the engine of the vehicle;
a connection disposed between the first portion and the second portion, in parallel with the switch, wherein the connection is configured to allow the ignition interface to provide signals directly to the starter motor to start the engine without activation of the switch.

2. The start-stop retrofit kit of claim 1, wherein the wire harness is configured to couple the start-stop module to an engine control unit.

3. The start-stop retrofit kit of claim 2, wherein the wire harness is configured to couple the start-stop module to an on-board diagnostics port of an engine control unit.

4. The start-stop retrofit kit of claim 3, wherein the wire harness is configured to couple the start-stop module to an on-board diagnostics II (OBDII) port of the engine control unit.

5. The start-stop retrofit kit of claim 1, wherein the wire harness is configured to couple the start-stop module to a brake light system of the vehicle to monitor brake usage.

6. The start-stop retrofit kit of claim 1, wherein the wire harness is configured to couple the start-stop module to a clutch system of the vehicle to monitor clutch usage.

7. The start-stop retrofit kit of claim 1, wherein the ignition interface of the vehicle is a push-button ignition interface.

8. The start-stop retrofit kit of claim 1, wherein the ignition interface of the vehicle is a remote-start ignition interface.

9. The start-stop retrofit kit of claim 1, comprising an absorption glass mat (AGM) battery coupled to the start-stop module and to the vehicle.

10. The start-stop retrofit kit of claim 1, wherein the one or more parameters monitored by the start-stop module comprise a speed of the vehicle, a speed of the engine, a voltage of a battery of the vehicle, a current of the battery, a state of charge (SOC) of the battery, a temperature of the battery, or any combination thereof.

11. The start-stop retrofit kit of claim 1, comprising a hydraulic pump coupled to a transmission of the vehicle to circulate hydraulic fluid through the transmission when the start-stop module stops the engine during operation.

12. The start-stop retrofit kit of claim 11, wherein the hydraulic pump comprises a controller that is coupled to the start-stop module, wherein the controller is configured to receive instructions from the start-stop module to activate and deactivate the hydraulic pump.

13. The start-stop retrofit kit of claim 1, comprising a handheld computing device configured to receive data related to operation of the vehicle from the start-stop module, and configured to provide a user interface for a driver to view driving efficiency, operational parameters of the vehicle, driver recommendations, or a combination thereof.

14. The start-stop retrofit kit of claim 13, wherein the handheld computing device comprises a smartphone or personal data assistant (PDA).

15. The start-stop retrofit kit of claim 13, wherein the handheld computing device is configured to send at least a portion of the received data related to operation of the vehicle to a remote monitor for further processing.

16. The start-stop retrofit kit of claim 15, wherein the remote monitor is configured to utilize the received data to determine benchmarking data, inventory control data, or a combination thereof.

17. A method, comprising:
delivering an activation signal from an ignition interface of a vehicle to a starter motor of the vehicle via a first pathway to activate an engine of a vehicle;
delivering a deactivation signal when a processor of a start-stop module determines that the engine is idling, or a brake of the vehicle is applied, or a combination thereof; and
delivering a reactivation signal from the ignition interface to the starter motor via a second pathway that is separate from the first pathway to reactivate the deactivated engine when the processor of the start-stop module determines that the brake of the vehicle is released, a transmission of the vehicle is not engaged, or a parameter of a battery of the vehicle is beyond a threshold value, or a combination thereof.

18. The method of claim 17, wherein the engine is determined to be idling when the speed of the vehicle is approximately zero and a speed of the engine is below a second threshold value.

19. The method of claim 17, wherein receiving an activation signal from an ignition interface comprises receiving an activation signal from a push-button ignition interface or a remote-start ignition interface.

20. The method of claim 17, comprising delivering a signal to activate a hydraulic pump to circulate hydraulic fluid through a transmission of the vehicle when the engine of the vehicle is deactivated, and comprising delivering a deactivation signal to deactivate the hydraulic pump when the engine of the vehicle is activated or reactivated.

21. The method of claim 17, comprising monitoring one or more parameters of the vehicle using one or more sensors of the vehicle and the processor of the start-stop module determining driving efficiency, operational parameters of the vehicle, driver recommendations, or a combination thereof, based on the one or more monitored parameters of the vehicle.

22. The method of claim 21, comprising transmitting the determined driving efficiency, operational parameters of the vehicle, driver recommendations, or a combination thereof, to a handheld computing device for display to a driver of the vehicle.

23. The method of claim 17, wherein the parameter of the battery comprises a voltage of the battery, a state of charge (SOC) of the battery, or a current of the battery.

24. A method of retrofitting a vehicle with a start-stop module that includes a wire harness, comprising:
plugging an on-board diagnostics II (OBDII) connector of the wire harness into an OBDII port of an engine control unit;
plugging a brake light connector of the wire harness into a brake light interface of the vehicle;
plugging an ignition interface connector of the wire harness into an ignition interface of the vehicle;
plugging a starter motor connector of the wire harness into a starter motor of the vehicle, wherein the ignition interface connector and the starter motor connector of the wire harness are directly connected to one another via a first pathway and are separated by a switch via a second pathway, wherein the switch is communicatively coupled to the start-stop module and is configured to start and stop the engine of the vehicle based on control signals from the start-stop module; and
plugging a battery sensor connector of the wire harness to a battery sensor of the vehicle.

25. The method of claim 24, comprising installing an absorption glass mat (AGM) battery in the vehicle.

26. The method of claim 25, comprising coupling the AGM battery to one or more battery sensors, and communicatively coupling the start-stop module to the one or more sensors.

27. The method of claim 26, installing the battery sensor in the vehicle, wherein the battery sensor is configured to monitor a state of charge (SOC), temperature, and/or voltage of the battery.

28. The method of claim 24, wherein the vehicle is a hybrid xEV.

29. A vehicle retrofitted according to the method of claim 24.

* * * * *